US006114416A

United States Patent [19]
Kolla et al.

[11] Patent Number: 6,114,416
[45] Date of Patent: Sep. 5, 2000

[54] FLAX SHIVES REINFORCED THERMOSETTING RESIN COMPOSITION

[75] Inventors: Francis A. Kolla, Saskatoon; John J. Balatinecz, Toronto, both of Canada

[73] Assignee: Cargill, Limited, Canada

[21] Appl. No.: 09/365,527

[22] Filed: Aug. 2, 1999

Related U.S. Application Data

[63] Continuation of application No. 09/064,937, Apr. 22, 1998, abandoned.

[51] Int. Cl.$^7$ .................................................... C08K 11/00
[52] U.S. Cl. .................................. 524/9; 524/15; 524/17
[58] Field of Search .................................. 524/9, 15, 16, 524/17

[56] References Cited

U.S. PATENT DOCUMENTS

| | | |
|---|---|---|
| 4,201,835 | 5/1980 | Jellinek et al. . |
| 5,002,273 | 3/1991 | Palarday et al. . |

FOREIGN PATENT DOCUMENTS

| | | |
|---|---|---|
| 2090849 | 7/1982 | United Kingdom . |
| WO 98/03705 | 1/1998 | WIPO . |

OTHER PUBLICATIONS

Akin et al., "Chemical and Structural Analysis of Fiber and Core Tissues from Flax," *J. Sci. Food Agric* 1996. 72, 155–165.

Cooke, "High Performance Fiber Composites with Special Emphasis on the Interface," *J. Polymer Eng.*, vol. 7, No. 3, pp. 199–240 (1987).

Hornsby et al., "Preparation and Properties of Polypropylene Composites Reinforced with Wheat and Flax Straw Fibers," *J. Materials Sciences* 32 (1997) 443–449.

Love et al., "Determination of Phenolic Structures in Flax Fibre by Solid–State $^{13}$CNMR," *Phytochemistry*, vol. 35, No. 2, pp. 489–491 (1994).

McDougall, "Isolation and Partial Characterization of the Non–Cellulosic Polysaccharides of Flax Fiber," *Carbohydrate Research*, 241 (1993) 227–236.

McDougall et al., "Plant Fibers: Botany, Chemistry and Processing for Industrial Use," *J. Sci. Food Agric.* 1993, 62, 1–20.

Michell et al., "Cellulosic Fibers for Reinforcement," *Appita*, vol. 31, No. 5 pp. 347–353 (1978).

Mieck et al., "Needle–Punched Nonwovens of Flax and PP Fibers–Textile Semiproducts for Manufacturing of Fiber Composites," *Polymer Composites*, Dec. 1996, vol. 17, No. 6, pp. 873–878.

Morvan et al., "Etude Physicochimique et Biochimique de Polysaccharides Extraits de Lin Sons–Rovi," *Plant Physiol. Biochem.*, 1989, 27(3), 451–459.

Park et al., "A Comparison of Compounding Processes for Wood–Fiber/Thermoplastic Composites," *Polymer Composites*, Jun. 1997, vol. 18, No. 3, pp. 425–431.

Riley et al., "Factors Affecting the Impact Properties of Mineral Filled Polypropylene," *Plastics and Rubber Processing and Applications*, 14 (1990) 85–93.

Sharma, "Enzymatic Degradation of Residual Non–Cellulosic Polysaccharides Present on Dew–Rotted Flax Fibers," *Appl. Microbiol. Biotechnol.*, (1987) 26: 358–362.

Trass et al., "Fine Grinding of Wood Chips and Wood Wastes with SZEGO Mill," in Sixth Canadian Bienergy R & D Seminar, B.C., Canada, 198–208, 1987.

Woodhams et al., "Wood Fibers as Reinforcing Fillers for Polyolefins," Polymer Engineering and Science, Oct., 1984, vol. 24, No. 15, pp. 1166–1171.

Pott et al.,"Upgraded Flax Fibres as Reinforcement in Polymer Composites", apparently arising from a conference and articles in Advanced Materials and Processes and applications vol. 2; Polymers and Ceramics–European Conference; 5th P: 2/107–2/110, Zwijndrecht, Netherlands Society for Materials Science, 1997; Conference Paper; Conference Editors: Sarton, L.A. J.L.; Zeedijk, H.B.; Conference Sponsor: Netherlands Society for Materials Science; Conference Location: Maastricht, The Netherlands; Conference Date: Apr. 1997 (199704) (19704), also known as Euromat 97.

El–Hariri et al., "Magnifying utility of flax root debris in particle board manufacture," Proceedings of the First Workshop of the Non–Textile Applications of Flax Working Group, pp. 6–9, Nov. 14–15, 1994, Poznan, Poland.

Gayer, "Natural Fibres in Automotive Components," Proceedings of the First Workshop of the Non–Textile Applications of Flax Working Group, pp. 20–21, Nov. 14–15, 1994, Poznan, Poland.

El–Hariri et al., "Economic Importance of Flax in Egypt" and "Magnifying utility of flax root debris in particle board manufacture," Proceedings of the First Workshop of the Non–Textile Applications of Flax Working Group, pp. 1–9, Nov. 14–15, 1994, Poznan, Poland.

Kozlowski et al., "Plant Residues as Raw Materials for Particleboards," Proceedings of the First Workshop of the Non–Textile Applications of Flax Working Group, pp. 22–41, Nov. 14–15, 1994, Poznan, Poland.

*Primary Examiner*—Nathan M. Nutter
*Attorney, Agent, or Firm*—Fitch, Even, Tabin & Flannery

[57] ABSTRACT

The present invention is directed to flax shives reinforced thermosetting resin compositions and a method for reinforcing thermosetting resins. The present invention provides a use for flax shives, which is the portion left over after processing plant materials to separate plant fibers (bast fibers) from the shives.

22 Claims, No Drawings

FLAX SHIVES REINFORCED THERMOSETTING RESIN COMPOSITION

This is a continuation of prior application Ser. No. 09/064,937, filed Apr. 22, 1998 abandoned, which is hereby incorporated herein by reference in its entirety.

The present invention relates to a thermosetting composite resin composition which includes flax shives, and a method for reinforcing thermosetting resin compositions. More particularly, shives or mixture of shives and bast fiber is blended with a thermosetting resin to provide a reinforced resin composite.

BACKGROUND OF THE INVENTION

The plastics industry is one of the largest consumers of organic and inorganic fillers. The total consumption of different types of fillers was about 3.5 million MT in the year 1983 and it is increasing at a rate of 4 to 5% annually. Inorganic fillers such as calcium carbonate, talc, mica and the like are well known, as well as organic fillers such as wood flour, chaff and the like, fibrous materials such as asbestos and glass fiber, as well as graphite, cokes, blown asphalt, activated carbon, magnesium hydroxide, aluminum hydroxide and the like. All of these additives have high specific gravities and their ability to improve physical properties of the composition is limited.

Flax is a commercially important plant fiber crop being grown either for its seed (used in the production of linseed oil) or for its fiber or both. The major industrial uses of flax fiber are in textiles (in the manufacture of linen household textile, linen furnishing fabrics, linen clothing, etc.) and the manufacture of pulp and paper. In the pulp and paper industry, flax fibers are currently used in the production of thin strong papers such as cigarette papers, airmail papers, currency papers, high quality permanent record bond papers and high quality writing papers.

Another possible use for flax fiber is in the filling and reinforcement of thermoplastic matrix resins, such as polyethylene and polypropylene. Composites of these plastics with lignocellulosic fillers (e.g. wood flour) are already in commercial use, for example, in such applications as interior molded auto parts (e.g. dash and door panels, trunk liners), exterior plastic-composite lumber and furniture components.

The potential of using flax fibers in plastic applications as a substitute for synthetic fibers such as glass, carbon, nylon, polyester, etc. has been recognized. For example, GB 2090849 describes the incorporation of flax bast fibers into a thermoplastic resin blend. The use of flax bast fibers for reinforcing resins results in processing problems, as the flax bast fibers tend to "ball up" during processing. Thermosetting resin blends containing flax shives or combinations of shives and less than about 30 weight percent bast fibers are not described. Further, purposeful attempts have been made to exclude flax shive from flax fiber preparations used for reinforcing composites. For example, Mieck et al. (*Polymer Composites*, December 1996, Vol. 17, No. 6), suggest that for better composite characteristics, the fibers should be free from shives.

An object of the present invention is to provide a resin composition that is reinforced with flax shives.

It is another object of the invention to provide a method for reinforcing thermosetting resin compositions.

Other objects, advantages, features and characteristics of the present invention will become more apparent upon consideration of the following description and the appended claims.

SUMMARY OF THE INVENTION

The present invention is directed to flax shives reinforced thermosetting resin compositions and a method for reinforcing thermosetting resins. The present invention provides a use for flax shives, which is the portion left over after processing plant materials to separate plant fibers (bast fibers) from the shives.

In accordance with the invention, a thermosetting resin is blended with from about 10 to about 80 weight percent flax shives, based on the weight of the composition. In an important aspect of the invention, the thermosetting resin should have a curing temperature of not more than about 230° C., preferably between about 150° C. and about 200° C. In another important aspect of the invention, the thermosetting resin when cured has a density of not more than about 1.5 g/cm$^3$. The thermosetting resin may include polyester, phenolic resins, melamines, isocyanates and mixtures thereof.

In another aspect of the invention, the flax shives that are blended with the resin are supplied as shives which include not more than about 30 weight % bast fibers, and in an important aspect, not more than about 10 weight % bast fibers, and in a very important aspect, not more than about 5 weight % bast fibers. We have found that with higher bast content, the bast fibers will ball and be deleterious to making composites. In the aspect of the invention where the shives include bast fibers, the bast fibers have a mean fiber length of less than about 2 mm. The flax shives should not have a mean particle size of more than about 10 mesh (which means the particles should be able to pass through a 10 mesh screen or smaller screen), in a very important aspect of the invention, the flax shives have a mean particle size of about 10 to about 100 mesh. In an aspect of the invention where a more woody surface texture is desired, flax shives are used where about 70% of the flax shives will pass through 10–20 mesh.

In another aspect of the invention, flax shives blended with thermosetting resin have a flexural strength of at least about 5,000 psi, and a flexural modulus of at least about 10×10$^6$ psi. Articles molded with flax shives reinforced thermoplastic resins had significantly lower densities, such as at least about 8% lower than articles molded with resins having inorganic fillers.

In another aspect, the present invention provides a method for reinforcing thermoset resin compositions. In accordance with the method of the invention, from about 10 to about 80 weight percent flax shives, based on the weight of the composition, is blended with resin. The flax shives include not more than about 30 weight % bast fibers, and in an important aspect, not more than about 10 weight % bast fiber, and in a very important aspect, not more than about 5 weight % bast fibers. In the aspect of the invention where the shives includes bast fibers, the bast fibers have a mean fiber length of less than about 2 mm. In an important aspect of the invention, the flax shives should not have a mean particle size of greater than about 10 mesh, and in an important aspect, a mean particle size in the range of from about 10 to about 100 mesh.

The blending of thermosetting resin and flax shives is effective for providing a reinforced thermosetting resin composition having a flexural strength of at least about 5,000 psi, and a flexural modulus of at least about 1.0×10$^6$ psi.

DETAILED DESCRIPTION OF THE INVENTION

Definitions

"Flax" as referred to in the present application refers to plant fiber crops being grown either for seed (i.e. linseed oil) or for its fiber or for both. Examples of such crops include *Lignum usitatissimum* (common flax), *L. usitatissimum album* (white-flowered flax), and *L. usitatissimum vulare* (blue-flowered flax).

The high quality fibers of flax are from the stem of the plant and are in the phloem or bast, hence the reference to flax as a "bast fiber" crop. As used herein, "bast" refers to those fibers from the phloem region. Further, as used herein, flax "shives" refers to the core tissue particles that remain after bast fibers are separated from the flax stem. Flax shives include blends and mixtures of all cell types including vascular bundles and parenchyma cells.

As used herein, the term thermoset resin refers to resins which after the application of heat is then stable to heat and can not be made to flow or melt and includes polyesters, phenolic resins, melamines, isocyanates, and mixtures thereof.

"Crosslinker" means a di- or polyfunctional substance containing functional groups that are capable of forming covalent bonds with groups that are present on the thermosetting resin. Amino resins, polyisocyanate and epoxy resins are members of this class; melamine resins are a sub-class of amino resins. The crosslinking agent may be a blend, hence, there may be more than one substance which forms a blend of substances which forms covalent bonds.

Flax Shives Used In The Invention

In an important aspect of the invention, flax shives is supplied as at least about 70 weight % shives, and in an important aspect, at least about 90 weight % shives, and in a very important aspect about 95 weight percent shives. An example of a process for the production of flax shive is described in U.S. Ser. No. 09/032,903, filed Mar. 2, 1998, which is hereby incorporated by reference, and in PCT/CA97/00511, published on Jan. 29, 1998 as WO98/03705, which is also hereby incorporated by reference.

The morphological nature and chemical composition of the flax shive may influence many mechanisms that contribute to the properties and performance of reinforced composites. These include, the dispersion and orientation of shive and bast fibers in the matrix polymer, the compatibility of shive and bast fibers to matrix polymer, the reactivity of shive and bast fibers with additives, the resistance to microorganisms and the resistance to water uptake.

All chemical analyses and procedures were done according to the Technical Associate of the Pulp and Paper Industry (TAPPI) test methods as shown in Table 1. Flax shives used in the invention may be characterized chemically as set forth in Table 2. Generally, however, the shives used in the invention do not have more than about 24 weight percent lignin, and preferably less than about 20 weight percent lignin, and have more than about 70 weight percent polysaccharides. Indeed, the shives used in the invention are distinct from lignocellulosic wood fillers, such as wood flour, not only because of a lower lignin content in shives, but also as compared to wood flour, flax shive particles are more longitudinal in shape whereas wood flour particles are isodiametric in shape (i.e., length and width as nearly identical). Further, hardwoods and softwoods tend to be more heterogenous in cell type then flax shive and, hence, wood flour from hardwoods and softwood has a less consistent and predictable composition as compared to flax shives.

The flax shives should not have a mean particle size of more than about 10 mesh, and in an important aspect, the shives have mean particle sizes of from about 10 to 100 mesh and in another aspect, not more than about 25 weight percent of the particles are smaller than 100 mesh. A finer material could be used but would not have the reinforcing effect of a material having a larger particle size.

TABLE 1

Chemical analysis and TAPPI test methods

| Chemical Analysis | TAPPI test methods |
| --- | --- |
| Moisture content | T 258 om-85 |
| pH of water extract | T 252 om-90 |
| Extractives | |
| Hot water | T 204 os-76 |
| Alcohol-benzene | T 204 os-76 |
| Acetone | T 204 os-76 |
| Di-chloromethane | T 204 os-76 |
| 1% sodium hydroxide | T 212 om-88 |
| Holocellulose | T 212 om-75 |
| α-cellulose | T 203 om-88 |
| Klason lignin | T 222 om-83 |
| Inorganic compounds | |
| Ash | T 211 om-85 |
| Silicates | T 245 om-88 |

TABLE 2

Chemical analysis of flax shives

| Composition | shive |
| --- | --- |
| Basic density, g/cm$^3$ | 1 to 1.2 |
| Moisture content, % | 7.5 |
| pH of water extract | 6.5 |
| Extractives | |
| Hot water, % | 4.4 |
| Alcohol-benzene, % | 2.1 [0.1] |
| Acetone | 0.9 |
| Di-chloromethane | 2.1 [0.1] |
| 1% NaOH, % | 28 [1] |
| Holocellulose | |
| α-cellulose, % | 38.6 |
| β-cellulose % | 14.1 [0.5] |
| γ-cellulose | 23.6 [0.8] |
| Klason lignin, % | 19.0 |
| Inorganic materials | |
| Ash, % | 2.0 [0.1] |
| Silicates, ppm | 737.5 |

Note: values for extractives are not additive.
[ ]-standard deviations

Preparation of Fiber Reinforced Composites

In an important aspect of the invention, from about 10 to about 80 weight percent flax shive is blended with the thermoset resin.

Polymer matrix is blended or compounded with fibers in a manner effective for completely blending the flax shives with the thermoset resin. Resin is mixed with fibers at about ambient temperature and the resin is then cured with heat.

What is claimed is:

1. A reinforced thermosetting resin composition comprising:

a thermosetting resin; and from about 10 to about 80 weight percent flax shives, based on the weight of the composition, the flax shives having not more than about 30 weight % bast fibers, the bast fibers having a mean fiber length of less than about 2 mm, and the flax shives having a mean particle size of not more than about 10 mesh.

2. The composition of claim 1 wherein the reinforced thermosetting resin composition after curing has a tensile strength of at least about 5000 psi, and a flexural modulus of at least about $1.0 \times 10^6$ psi.

3. The composition of claim 1 wherein the thermosetting resin has a curing temperature of not more than about 230° C.

4. The composition of claim 1 wherein the thermosetting resin composition has a density of not more than about 1.5 g/cm³ after curing.

5. The composition of claim 1 wherein the thermosetting resin is selected from the group consisting of a polyester resin, a phenolic resin and mixtures thereof, and the composition further comprises a crosslinker selected from the group consisting of a melamine, an isocyanate, and mixtures thereof.

6. A method for reinforcing a thermosetting resin composition comprising:
    blending from about 10 to about 80 weight percent flax shives, based on the weight of the composition, with a thermosetting resin, the flax shives having not more than about 30 weight % bast fibers, the bast fibers having a mean fiber length of less than about 2 mm, the flax shives having a mean particle size of not more than about 10 mesh.

7. The method of claim 6 wherein the method is effective for providing a reinforced thermosetting resin composition which when cured has a flexural strength of at least about 5,000 psi, and a flexural modulus of at least about $1.0 \times 10^6$ psi.

8. The method of claim 6 wherein the thermosetting resin has a curing temperature of not more than about 230° C.

9. The method of claim 6 wherein the thermosetting resin composition a density of not more than about 1.5 g/cm³ after curing.

10. The method of claim 6 wherein the thermosetting resin is selected from the group consisting of a polyester resin, phenolic resins and mixtures thereof, and the composition further comprises a crosslinker selected from the group consisting of melamines, isocyanates, and mixtures thereof.

11. A reinforced thermosetting resin composition comprising:
    a thermosetting resin; and
    from about 10 to about 80 weight percent flax shives, based on the weight of the composition, the flax shives having not more than about 10 weight % bast fibers, the bast fibers having a mean fiber length of less than about 2 mm, and the flax shives having a mean particle size of at least about 10 mesh.

12. The composition of claim 11 wherein the reinforced thermosetting resin composition which when cured has a tensile strength of at least about 5000 psi, and a flexural modulus of at least about $1.0 \times 10^6$ psi.

13. The composition of claim 11 wherein the thermosetting resin has a curing temperature of not more than about 230° C.

14. The composition of claim 11 wherein the thermosetting resin composition has a density of not more than about 1.5 g/cm³ after curing.

15. The composition of claim 11 wherein the thermosetting resin is selected from the group consisting of a polyester resin, phenolic resin and mixtures thereof, and the composition further comprises a crosslinker selected from the group consisting of a melamine, isocyanate, and mixtures thereof.

16. The composition of claim 11 wherein the flax shives includes not more than about 5 weight % bast fibers.

17. The composition of claim 11 wherein the flax shives have a mean particle size of about 10 to about 100 mesh.

18. The composition of claim 16 wherein the flax shives have a mean particle size of about 10 to about 100 mesh.

19. The composition of claim 1 wherein the flax shives include not more than about 5 weight % bast fibers.

20. The composition of claim 19 wherein the flax shives have a mean particle size of about 10 to about 100 mesh.

21. The method of claim 16 wherein the flax shives have a mean particle size of about 10 to about 100 mesh.

22. The method of claim 19 wherein the flax shives include not more than about 5 weight % bast fibers.

* * * * *